April 27, 1965
F. D. CARPENTER
3,180,636
WORK HOLDER FOR SUPPORTING A BRITTLE ARTICLE
DURING A MACHINING OPERATION
Filed Aug. 15, 1961
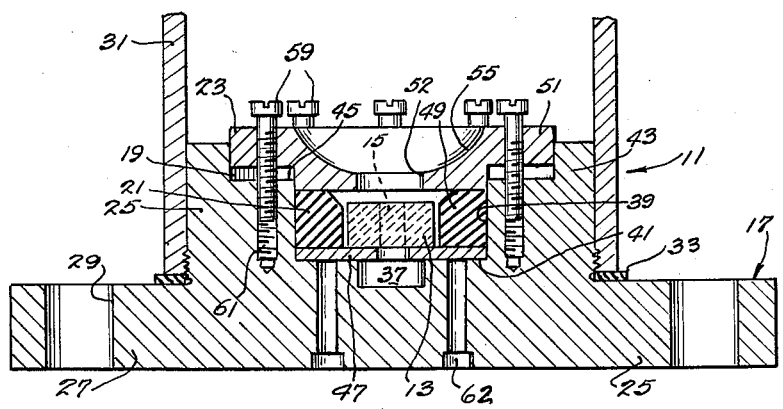
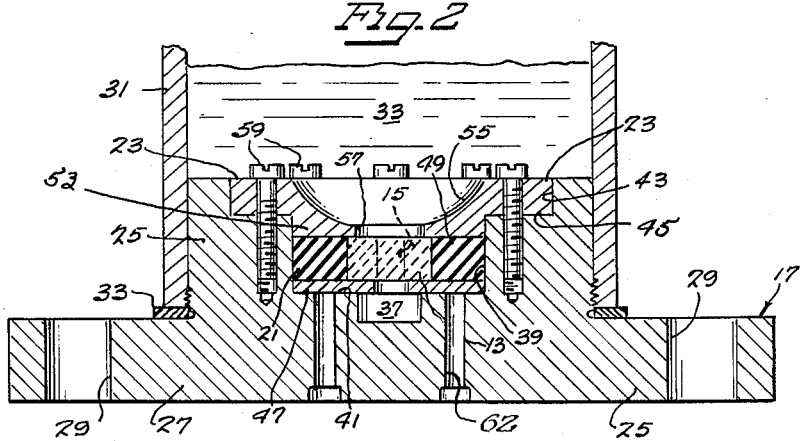
Inventor
FREDRICK D CARPENTER
By
Soans, Anderson, Luedeka & Fitch
Attys

United States Patent Office 3,180,636
Patented Apr. 27, 1965

3,180,636
WORK HOLDER FOR SUPPORTING A BRITTLE ARTICLE DURING A MACHINING OPERATION
Frederick D. Carpenter, San Diego, Calif., assignor to General Dynamics Corporation, New York, N.Y., a corporation of Delaware
Filed Aug. 15, 1961, Ser. No. 131,561
4 Claims. (Cl. 269—224)

This invention relates to work holders, and in particular, to work holders adapted to maintain a brittle object in a stationary position during a machining operation.

Certain properties desirable and sometimes necessary in components of particular scientific and industrial devices are found in materials which are brittle. For example, in the thermionic converter art, and particularly in a thermionic emitter frequently used in conjunction with a nuclear reactor, a ring-shaped cathode formed of a uranium or zirconium-carbide is sometimes used. This material, while possessing the high density and low porosity needed in this particular application, is very brittle and accordingly difficult to shape or machine, particularly when high tolerance is required.

While the materials in question are generally of a high compressive strength, they have such low tensile strength as to be easily fractured during machining. In particular, where there is a need for internal machining, such as the drilling or reaming of a hole, the tensile or transverse forces imposed by the machine tool can rupture the material readily, with the expensive result that successful machining of only 20% of such articles has not been uncommon.

The principal object of this invention is to provide an improved method of machining brittle articles.

Another object of the invention is to provide a method for machining brittle articles in which compressive forces are utilized to counteract the internal tensile forces set up during the machining.

A further object of the invention is to provide a work holder for supporting a brittle article during a machining operation, which holder applies compressive forces to the article so as to counteract internal tensile forces which are set up during the machining.

Other objects and advantages of the present invention will become apparent with reference to the following description and accompanying drawing.

In the drawing:
FIGURE 1 is a front sectional view of a work holder in accordance with the present invention, with the brittle article in place therein, but prior to the application of compressive forces; and FIGURE 2 is a sectional view similar to that of FIGURE 1, but with the brittle article rigidly secured in place by the application of compressive forces.

Very generally, the present invention comprises a method for machining a brittle article in which substantially uniform pressure is applied to the outer surface of the object so as to set up internal compressive forces in the same planes as, and in opposition to, the tensile stresses induced by the machining operation, and machining the object while the external pressure is applied. The invention also contemplates a work holder for supporting a brittle object in accordance with the proposed method.

Referring now to the drawings for the more detailed description of the invention, there is shown in both figures a work holder, designated generally as 11, which is adapted to support a carbide disk or pellet 13 for the drilling or surface machining of a longitudinal hole 15 which extends axially through the article.

The work holder 11 comprises a base or support 17 having a central cavity or well 19 to receive and surround the work piece 13. A non-rigid medium 21 is disposed intermediate the walls of the confining well 19 and the work piece 13, and is adapted to be placed under pressure by means of an overlying clamp 23, the pressure being resisted by the wall of the confining well 19 so as to thereby apply compressive pressure inwardly upon the outer surface of the work piece 13. The external pressure upon the work piece in turn develops internal compressive stresses directed in large measure in the same planes as, and in opposition to, the internal tensile stresses induced by the machining operation.

More particularly, the support 17 includes a cylindrical boss or anvil 25 the base of which is extended to form a bolting flange 27 provided with holes 29 for securing the fixture to the table or bed of a suitable machine tool, for example, a drill press or Cavitron.

It is desirable that a liquid such as acetone or carbon tetrachloride, which suspends the cutting media and which will cool and lubricate the tool and article and also carry away material as it is removed from the work piece, be provided in surrounding relation to the cutting tool during the machining operation. Accordingly, a liquid retainer in the form of an upstanding cylindrical sleeve 31 surrounds the boss 25 of the support 17 in close fitting relation thereto and extends upwardly therefrom so as to form, with the base 17, a container adapted to maintain a pool 33 of liquid around the work piece 13 and the tool.

The lower end of the sleeve 31 is provided with internal threads which cooperate with external threads provided on the lower end of the boss 25 to secure the sleeve 31 in position, and an annular gasket 33 is provided intermediate the lower end of the sleeve and upper surface of the bolting flange 27 to provide a seal between the sleeve and the support. In operation, the movement or vibration of the cutting tool causes sufficient agitation of the liquid coolant with cutting abrasive to effect a displacement and circulation of the carbide particles as they are removed from the work piece.

The well 19 comprises a succession of concentric bores in the boss 25. A deep bore 37 is of sufficient diameter to receive the cutting tool as it passes through the work piece 13, and also to receive the chips and waste from the operation to clear the tool as it breaks through the lower surface of the work piece. An intermediate bore 39 of greater diameter provides a ledge 41 to support the work piece 13 and walls to confine it, as will be more fully described. A still larger upper bore 43 provides a ledge 45 to seat the overlying clamp 23 and walls to guide its movement in clamping and unclamping the work piece.

As earlier indicated, the work piece 13 is positioned within the intermediate bore 39 and is preferably seated upon a washer 47 positioned on the ledge 41. The diameter of the intermediate bore 39 is substantially greater than the outer diameter of the work piece 13 so as to provide a space for the non-rigid medium 21 between the confining walls of the intermediate bore 39, and the outer side walls of the work piece.

The medium 21 may be any suitable non-rigid material which is capable of transmitting compressive forces when placed under pressure. In the preferred embodiment, it takes the shape of an annulus or ring 49 of rubber or similar plastic material which has an inner diameter closely approximating the outer diameter of the work piece 13, and an outer diameter closely approximating the diameter of the bore 39 so that the ring and work piece may be readily interfitted within the bore 39. The ring 49 is thicker than the work piece 13 but chamfered or rounded at the upper end of its central hole so that when it is compressed and deformed by the clamp 23, the ring will not overflow the top surface of the work piece.

The clamp 23 is essentially a circular plate 51 having a depending central boss 53. The plate 51 is of a diameter and depth substantially equal to that of the bore 43, and the boss 53 is of a diameter slightly less than that of the bore 39 so that it may fit easily within the upper portion thereof.

The upper face of the clamp 23 is hollowed out to form a central upwardly-facing concave depression 55 which serves to facilitate the circulation of liquid to the working zone of the cutting tool, and a central hole 57 in the center of the depression, large enough to freely accommodate the tool and flow of suspended abrasive coolant, provides access through the clamp 23 to the work piece.

A plurality of spaced cap screws 59 passing through the plate 51 near its periphery are threaded into tapped holes 61 in the boss 25 of the base or support 17, and when turned down, draw the clamp 23 into position to ready the work piece for the tool.

From the foregoing, it will be apparent that as the clamp 23 is pulled downwardly by the screws 59 to be ultimately seated on the ledge 45, the ring 49 is compressed, centering the work piece 13 in the bore 39, and substantially filling the annular space between the work piece, the bore 39, and the seated clamp 23, and exerting the desired compressive force on the sidewalls of the work piece.

To facilitate removal of the work piece after machining, holes 61 extend through the support 17 from the lower surface thereof upwardly to the ledge 41 formed by the bore 39. Knock-out pins (not shown) may be inserted through the holes, after the clamp 23 has been removed, so as to lift the washer 47 and, with it, the work piece 13 and ring 49, to a position where they can be easily grasped.

In using the work holder 11, the support 17 is fastened to a supporting surface below a drilling tool, and the washer 47 is placed on the ledge 41 of the bore 39. The ring 49 is then placed in overlying relation to the plate 63, and the work piece 13 inserted into the ring. The clamp 23 is then positioned in the bore 43 and the screws 59 are tightened.

When the clamp is forced into intimate contact with the ring 49, it causes vertical forces to be exerted on the ring which compress it and cause it to expand laterally. The lateral expansion of the ring causes horizontal compressive pressure to be exerted on the side walls of the work piece 13, which in turn develops internal compressive stresses within the article.

The coolant is poured into the sleeve 31 after the screws 59 are tightened, and the machining operation is begun. The tensile stresses induced within the work piece by the machining, and which would normally cause the article to fracture, are counteracted by the pre-induced compressive stresses applied by the work holder 11 to an extent that the resultant of the internal stresses is either compressive or, if tensile, of insufficient magnitude to cause fracture, and the article can thus be machined successfully.

The work piece is removed from the tool by pouring or draining off the coolant and then removing the screws 59 and clamp 23. The work holder is then unfastened from the supporting surface, if necessary, and knock-out pins are inserted through the holes 61 in the base to disengage the washer 47, work piece 13, ring 49, and clamp 23 from the cavity 19. It is, of course, possible to provide the supporting surface with openings to permit insertion of the knock-out pins, and it would then be unnecessary to remove the work holder from the supporting surface in order to use these pins.

The use of the above described work holder permits machining operations, which heretofore often caused the fracture of brittle objects, to be accomplished with substantially no failures, and results in a savings in time, labor, and in valuable materials.

While the present invention has been shown and described with reference to a particular application, that is, the machining of an internal bore in a brittle article, it should be clear that the method used is applicable to other machining operations as well. For example, internal compressive forces could be set up in a somewhat similar manner in an object which was undergoing a milling operation.

Moreover, while the particular work piece described is cylindrical and thus facilitates the use of an encircling ring of a compressible material, it should be clear that if an object having other than a cylindrical outer surface was being machined, the configuration of the compressible material and of the confining well could be modified to apply the compressive forces to the work piece without complete encirclement by the compressible material.

Various of the features of the invention believed to be novel are set forth in the following claims.

What is claimed is:

1. A device for holding a brittle cylindrical article in place during the machining of a bore passing longitudinally therethrough, said machining operation tending to set up tensile stresses in the article transverse to the longitudinal axis thereof, said device comprising fixed means defining a walled cavity open at one end to permit access to the article by a machine tool and having a surface at its opposite end apapted to receive the article in supporting engagement thereon, the side walls of said cavity being disposed so as to encircle an article disposed on the said article-supporting surface of the said cavity, a compressible ring positioned within said cavity with its outer walls adjacent the side walls of the cavity and having an opening therein adapted to receive the article with its longitudinal axis parallel to the longitudinal axis of the ring, the thickness of said ring measured along the longitudinal axis thereof being greater than the length of the article as measured along its longitudinal axis, and means for compressing said ring by forces applied parallel to the longitudinal axis thereof so as to cause said ring to expand raidally and set up internal compressive stresses in said article having components in opposition to said internal tensile stresses.

2. A device for holding an article in place during a machining operation in which tensile stresses are developed in the article by the machining, said device comprising a base having a surface upon which the article may be supported, a non-rigid medium disposed adjacent to said surface and encircling same, confining means positioned adjacent said non-rigid medium opposite said surface and adapted to limit expansion of said non-rigid medium in a direction away from said surface, and means for placing said non-rigid medium under pressure so as to cause it to expand in the direction of said surface and thereby set up internal compressive stresses in an article disposed on said surface having components in opposition to said internal tensile stresses.

3. A device for holding an article in place during a machining operation in which tensile stresses are developed in the article by the machining, said device comprising fixed means defining a walled cavity adapted to receive an article therein and open on one side to permit access to the article by a machining tool, a portion of the surface defining said cavity being adapted to support an article, a non-rigid medium disposed within said cavity in encircling relation to said supporting surface and positioned relative to walls of said cavity so as to enable said walls to limit expansion of said medium in a direction away from said supporting surface, and means for placing said non-rigid medium under pressure so as to cause it to expand in the direction of said supporting surface of said cavity and thereby set up compressive stresses in an article disposed on said surface having components in opposition to said internal tensile stresses.

4. A device for holding an article in place during a machining operation in which tensile stresses are developed in an article by the machining, said device comprising fixed means defining a walled cavity adapted to receive an article and open on one side to permit access by a machining tool to an article disposed in said cavity, a portion of the surface defining said cavity being adapted to support an article, a member formed of non-rigid medium disposed within said cavity in a position in which the walls of said cavity encircle said member, said member being provided with an opening to permit access to said article-supporting surface, and means for placing said member under pressure within said cavity so as to cause it to expand and thereby cause internal compressive stresses in opposition to said tensile stresses to be set up within an article positioned within the opening of said member and supported on said article-supporting surface.

References Cited by the Examiner

UNITED STATES PATENTS

| | | | |
|---|---|---|---|
| 1,457,307 | 6/23 | Kerns | 269—138 |
| 2,260,996 | 10/41 | Kruczek | 269—285 XR |
| 2,285,295 | 6/42 | Martindell | 269—224 XR |
| 2,592,229 | 4/52 | Alexay | 269—285 XR |
| 2,842,115 | 7/58 | Pepi | 125—35 |

FRANK SUSKO, *Primary Examiner.*

THOMAS J. HICKEY, ROBERT C. RIORDON, *Examiners.*